(12) United States Patent
Menze (10) Patent No.: US 6,396,210 B1
(45) Date of Patent: *May 28, 2002

(54) HEADLIGHT ADAPTER SYSTEM

(75) Inventor: Peter C. Menze, Marquette, MI (US)

(73) Assignee: M.P. Menze Research & Development Inc., Marquette, MI (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/484,043

(22) Filed: Jan. 18, 2000

(51) Int. Cl.$^7$ ................................. B60Q 1/02
(52) U.S. Cl. .................. 315/82; 307/10.8; 362/487
(58) Field of Search ....................... 315/82, 77, 83; 307/10.1, 10.8; 362/475, 487, 507

(56) References Cited

U.S. PATENT DOCUMENTS

| 4,280,062 A | | 7/1981 | Mlller et al. ............... 315/83 |
|---|---|---|---|
| 4,306,158 A | * | 12/1981 | Ogle ........................ 315/82 |
| 4,945,872 A | * | 8/1990 | Embry ..................... 307/10.5 |
| 5,323,140 A | * | 6/1994 | Boyles ..................... 307/10.1 |
| 5,420,480 A | * | 5/1995 | Knepel et al. ............ 315/82 |
| 5,841,203 A | * | 11/1998 | Chambers et al. ...... 307/10.8 |
| 5,909,084 A | * | 6/1999 | Fu et al. .................. 315/82 |
| 6,005,300 A | * | 12/1999 | Kelly ........................ 307/10.1 |
| 6,153,975 A | * | 11/2000 | Perdec ..................... 315/82 |
| 6,218,740 B1 | * | 4/2001 | Mildice .................... 307/10.1 |

* cited by examiner

Primary Examiner—Don Wong
Assistant Examiner—Thuy Vinh Tran
(74) Attorney, Agent, or Firm—Cyrus A. Morton; Oppenheimer Wolff & Donnelly LLP (57) ABSTRACT

A one-piece headlight adapter, and a two-piece headlight adapter system, is used to connect the existing vehicle headlight controls and power supply with a snowplow wiring harness. An adapter only connects the controls and power supply for one headlight to the wiring harness. Two adapters, one for each headlight, create an adapter system. The adapter system allows the vehicle operator to control the snowplow headlights from the inside of the vehicle. One version of an adapter is a three-component adapter that includes one connection to the vehicle headlight, one connection to the headlight controls, and one connection to the wiring harness. Another version of the adapter is a five-component adapter that includes high and low beam connections to the vehicle headlight, high and low beam connections to the headlight controls, and one connection to the wiring harness. In each version, the connections of the adapter include a connection to the common ground which ensures a fixed potential on which the snowplow headlights operate.

6 Claims, 6 Drawing Sheets

HEADLIGHT ADAPTER SYSTEM

BACKGROUND OF THE INVENTION

1. Field of the Invention

The present invention relates generally to snowplow lighting systems. More particularly, the present invention relates to an adapter for connecting an existing vehicle power supply and headlight controls to a snowplow wiring harness.

2. Description of the Related Art

One of the most common ways to move and remove fallen snow is with a snowplow attached to a vehicle. However, most vehicles are not dedicated to this single purpose. That is, during the milder seasons the snowplow is removed and the vehicle will be used for other purposes. These types of vehicles usually have headlights to facilitate night driving. However, when a snowplow is attached, it obscures the headlights making night driving or night plowing difficult if not impossible. Consequently, most snowplows have their own integrated headlights that are coupleable to the existing vehicle wiring system controls and power supply.

Traditionally, connecting snowplow headlights to the existing vehicle headlight wiring system has entailed the difficult and time consuming task of cutting and splicing wires. More modem wiring systems have utilized the existing plugs and terminals or receptacles. Thus, they have eliminated the need for a separate switch on the interior or exterior of the vehicle. For example U.S. Pat. No. 4,280,062 teaches an auxiliary light wiring harness that connects one existing vehicle plug to a pair of vehicle headlights and a pair of auxiliary headlights. The harness also includes a switch to allow an operator to activate the vehicle headlights or the auxiliary headlights when the existing lighting controls are actuated. U.S. Pat. No. 5,420,480 teaches an automatic headlamp switching system that utilizes a pair of relays that to enable the existing vehicle headlight controls to operate the snowplow headlights when the snowplow is electrically connected to the vehicle.

The known snowplow headlight wiring systems still have many problems. In systems like that taught in the '062 Patent, the auxiliary lights are hard-wired to the existing lighting system. Thus the entire system can only be used on the specific vehicle for which it is designed.

Known systems that utilize a wiring harness coupled to the existing lighting system by an adapter only connect to one side of the vehicle. Specifically, they attach to only one of the lights on the vehicle, thus, only drawing power from one side of the vehicle. The system is less reliable because if that one side fails, both headlights on the snowplow fail.

Known adapters usually have three to five different parts making installation more difficult. Complex instructions must be provided to enable the operator to properly attach the lights. This number of components and connectors also increases the chances of corrosion and shorts in the electrical system. Specifically, known systems have more than one connection to the wiring harness per headlight. Additionally, known systems do not pick up the ground of the vehicle or of the vehicle headlights, which can be positive or negative depending on the vehicle manufacturer. Consequently, known systems do not provide an uninterrupted common ground for the snow plow headlights. Thus, the snowplow headlights are not operating with a known potential reference. This can create undue strain on the snowplow wiring system and lead to a system failure because of a short circuit. This is especially problematic because the plow and associated lights are wired some distance from other electrical components making it difficult to connect to any ground but the plow itself which does not likely provide a good electrical connection.

Finally, known adapters have connectors that are not waterproof. This is largely because older vehicles do not have waterproof connectors for the adapter to plug into. However, given the harsh and often very wet conditions that exist when plowing snow, the lack of a waterproof system increases the likelihood of electrical shorts and lighting system failure. Consequently, newer vehicles come equipped with waterproof connectors that are not compatible with known adapters. Additionally, known systems to not have a waterproof connection to the wiring harness.

Therefore, there exists a need to provide an easily installed snowplow headlight adapter and adapter system that is highly reliable.

SUMMARY OF THE INVENTION

The present invention provides a one-piece headlight adapter. Two of these one-piece adapters can be used in tandem interchangeably on either headlight of a vehicle to create a two-piece headlight adapter system. The adapter provides a simple and efficient coupling to connect the existing vehicle headlight controls and power supply with a snowplow wiring harness. In a preferred embodiment the adapter is a three-component adapter that includes one connector compatible with the existing headlight power supply outlet on a vehicle, one connector compatible with the existing headlight plug-in on a vehicle, and one connector compatible with the headlight wiring harness on the snowplow. The connectors are coupled to the vehicle wiring system in such a way that the high and low beam headlight power supply, vehicle headlight ground signal, and the lighting controls, are electrically connected to the wiring harness. Thus, the vehicle operator can control the snowplow headlights from the inside of the vehicle using the vehicle's existing controls. A switch or a relay may also be electrically connected to the wiring harness so that the existing vehicle headlight controls can operate either the snowplow headlights, or the existing vehicle headlights, with the adapter in place.

The snowplow headlights operate efficiently by using the vehicle's headlight power supply and common ground, which can be a positive or a negative ground. The common ground connection ensures a fixed potential for the snowplow headlights. This is an improvement over the uncertain potential produced by known adapters which are not tied to a common signal source or a common ground. Consequently, the lights in these known systems may fluctuate and lead to faster burnout of the snowplow headlights. The adapter is also highly reliable because it utilizes a minimum number of components and, for newer vehicles, may have a self contained wiring structure such that the entire assembly is waterproof.

In another embodiment, a five-component one-piece adapter is provided for use on a vehicle having headlights with two connections. One connection is for high beams and the other connection is for low beams. In this embodiment the adapter includes two connectors coupleable to the existing vehicle headlight outlets, two connectors coupleable to the existing vehicle headlight plug-ins, and one connector coupleable to the snowplow wiring harness. This five-component adapter has the same advantages of simplicity and reliability as the three-component adapter.

When an identical pair of the above described adapters is used in combination, one adapter for each vehicle headlight, a novel adapter system is created. The system is easily implemented because the individual adapters are identical and interchangeable. That is, they can each be used for either the left or right headlight. More importantly, the system is highly reliable because it draws power from both vehicle headlight connections. Also, reliable common signal or common ground connections are made at each headlight connection. Thus, there is less demand on any given point in the vehicle headlight electrical system because the current running through each vehicle headlight is only that which is needed to power one snowplow headlight. This provides for increased control of the electrical signals in the lighting system. Controlling the current in the lighting system is a major improvement over the known adapters that draw current for both snowplow headlights from one vehicle headlight control connection. Additionally, safe operation of the lights is insured—if one side of the system does fail (be it the adapter itself or the vehicle's internal wiring) the other side will keep the snowplow headlights working.

It is an object of the present invention to provide an adapter system that maintains a constant potential by virtue of connections to the common ground signal from both existing headlights.

It is a further object of the present invention to provide an adapter that has a minimum number of connectors.

It is still a further object of the present invention to provide an adapter that is self contained and waterproof for use in vehicles with waterproof connectors.

It is still a further object of the present invention to provide an adapter with two or four connectors to the vehicle, depending upon the vehicle high and low beam are configuration, and one connection to the wiring harness.

It is still a further object of the present invention to provide an adapter system that draws positive current from both headlight connections to the vehicle.

It is still a further object of the present invention to create an adapter system having two interchangeable adapters, one for each side of the vehicle.

DETAILED DESCRIPTION OF THE PREFERRED EMBODIMENTS

Figure 1:
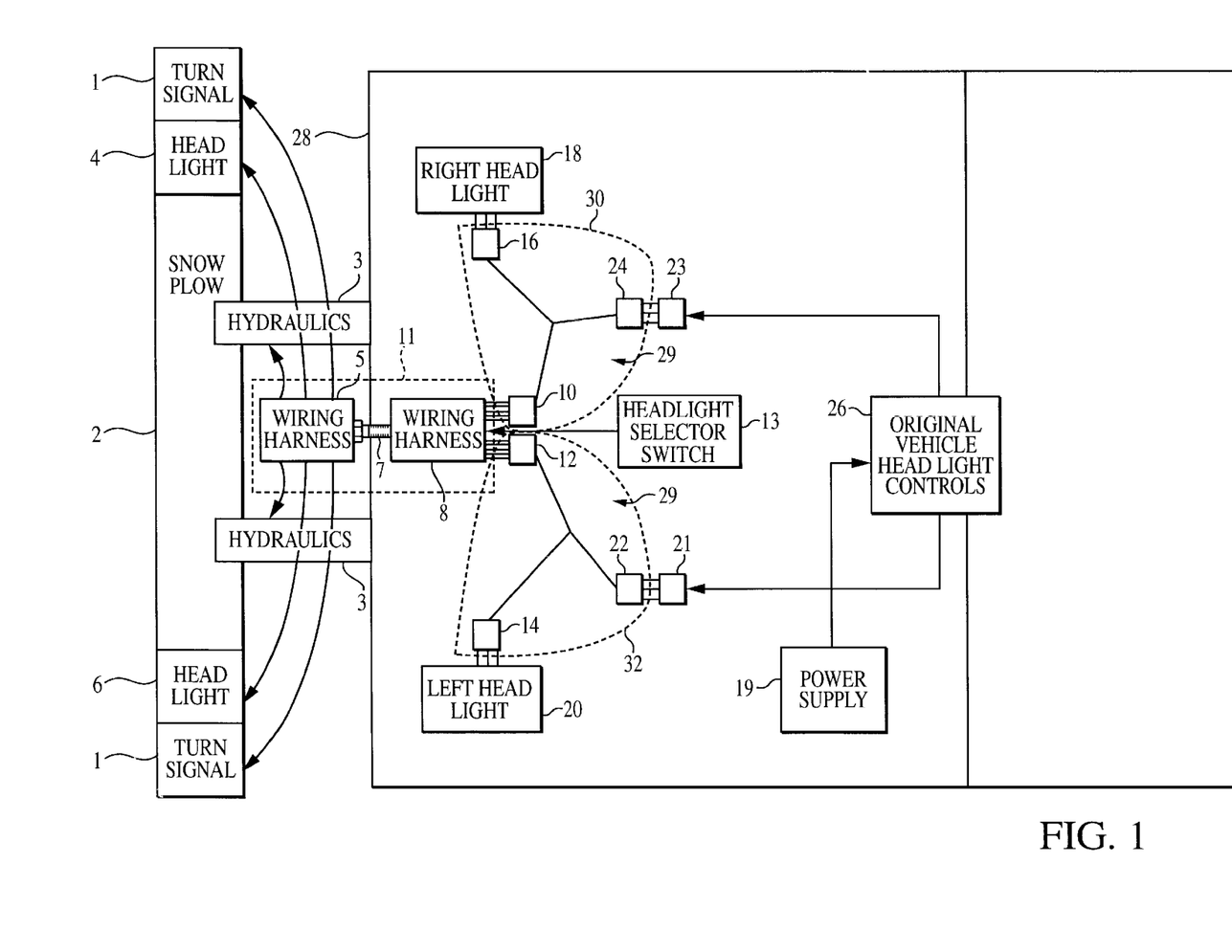
FIG. 1 is a block diagram of a headlight adapter system in conjunction with a vehicle and an attached snowplow.

FIG. 1 schematically depicts a headlight adapter system 29 as used to couple snowplow headlights 4 and 6 to a vehicle 28. The system 29 includes headlight adapters 30 and 32 connected between a vehicle 28 and a wiring harness 8 that is coupled to a snowplow 2. The snowplow 2 is mechanically coupled to vehicle 28 either permanently or temporarily. Either way, snowplow 2 must also be electrically coupled to vehicle 28. The electrical coupling is achieved by a wiring harness 11 comprising a snowplow connection portion 5, a vehicle connection portion 8, and a wiring harness connector 7 connecting both portions. Snowplow connection portion 5 electrically couples to snowplow turn signals 1, hydraulic actuators 3 (which serve to control the height and angle of the snowplow), and right and left snowplow headlights 4 and 6 respectively. Vehicle connection portion 8 electrically couples to vehicle 28 such that an operator of vehicle 28 can control snowplow turn signals 1, running lights not shown, hydraulic actuators 3, and snowplow headlights 4 and 6. Only the connections relating to snowplow headlights 4 and 6 are shown and further described herein. It is understood that all remaining lights (i.e. turn signals 1, running lights, etc.) are connected in a manner similar to that described below.

The vehicle 28 includes conventional components such as headlight controls 26 electrically coupled to vehicle headlights 18 and 20, and vehicle power supply 19. The electrical coupling of vehicle 28 to snowplow 2 by means of wiring harness 11 and headlight adapters 30 and 32 allows the operator to control snowplow headlights 4 and 6 from inside the cab of vehicle 28. In addition, wiring harness 11 may have a headlight selector switch 13 electrically coupled to it such that when switch 13 is in a first position, controls 26 operate existing vehicle headlights 18 and 20. When switch 13 is in a second position, controls 26 operate snowplow headlights 4 and 6. An example of the implementation of switch 13 may be found in U.S. Pat. No. 5,420,480. Switch 13 is not necessarily in the position shown in FIG. 1 and may in fact be an integral part of wiring harness 11. Switch 13 may be a predetermined automatic switch or a manual switch or any other appropriate switch.

In the present invention, right vehicle control connector 23 is disconnected from right headlight 18. This connection is replaced by right headlight adapter. 30 which includes a right headlight connector 16, a right control connector 24 and a right harness connector 10. Specifically, right headlight connector 16 is coupled with right headlight 18 and right control connector 24 is coupled with right vehicle control connector 23. Finally, right harness connector 10 is coupled with vehicle connection portion 8. Once adapter 30 is so coupled, headlight controls 26 will actuate at least right snowplow headlight 4 and potentially left snowplow headlight 6 depending on the snowplow connection portion 5. A left headlight adapter 32 is coupled in the same manner as headlight adapter 30, only with the components on the left side of vehicle 28, such that headlight controls 26 will actuate snowplow left headlight 6 and potentially right snowplow headlight 4.

Figure 2:
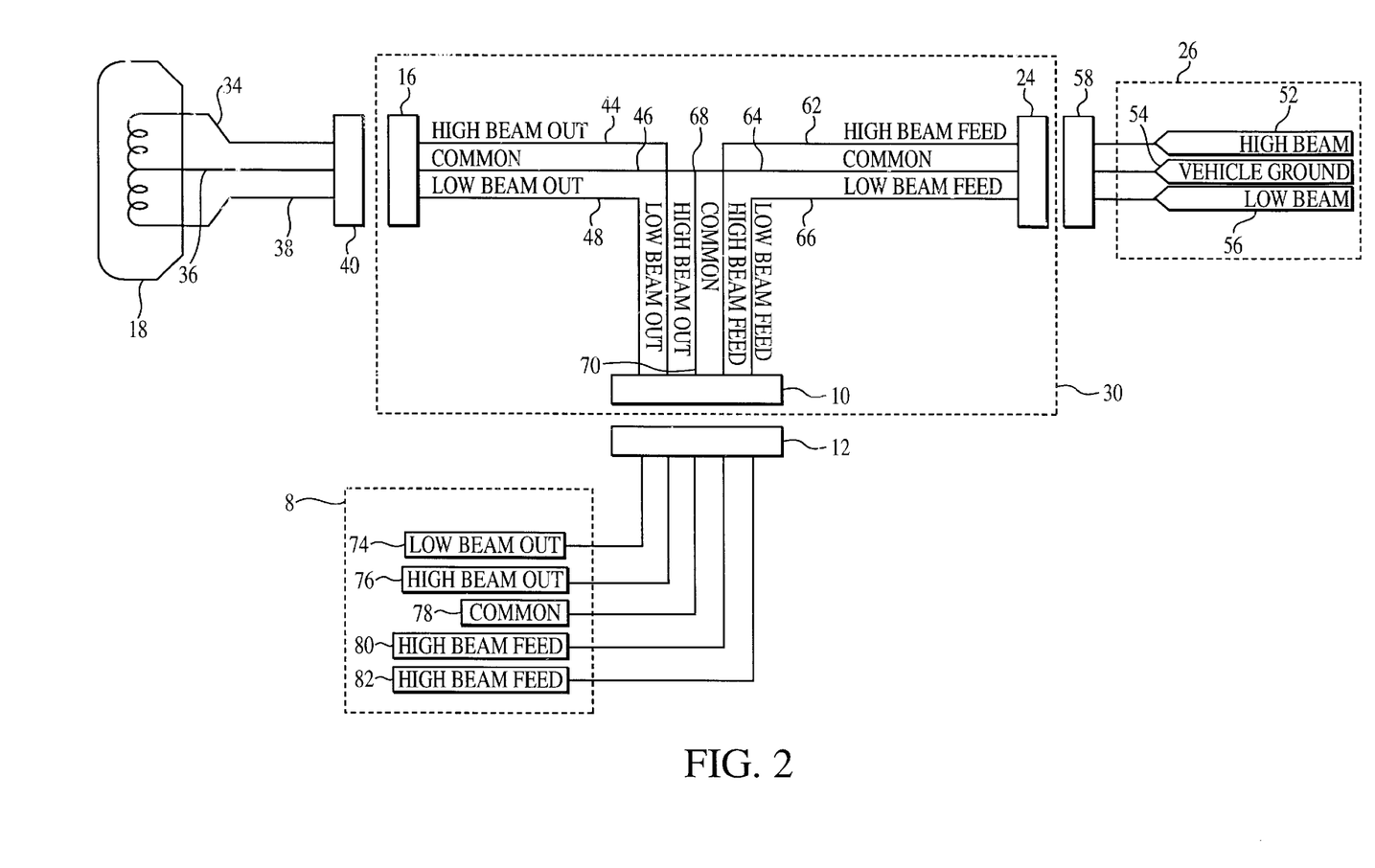
FIG. 2 is a wiring diagram of a three-component headlight adapter.
Figure 3:
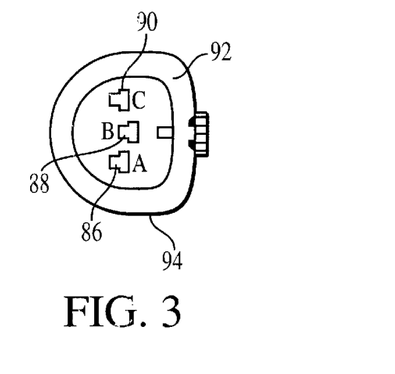
FIG. 3 is an end view of a vehicle connector on a three-component headlight adapter for use with a composite halogen headlight.

One embodiment of right headlight adapter 30 is shown in greater detail in FIG. 2. As can be seen, right headlight connector 16, is coupleable to right vehicle headlight 18 by inserting right headlight connector 16 into headlight plug 40. Right headlight connector 16 is adapted to fit in or over headlight plug 40. Headlight plug 40 is typically a three-prong plug electrical plug having a connection for high beam 34, ground 36, and low beam 38 of right vehicle headlight 18. Right headlight connector 16 is electrically coupleable to headlight plug 40 such that high beam 34 couples with high beam out 44, ground 36 couples with common ground 46, and low beam 38 couples with low beam out 48. One possible configuration of these three couplings as they appear on the face of headlight connector 16 is shown in FIG. 3 as high beam prong 90, common ground prong 88 and low beam prong 86. This configuration is commonly used with composite halogen headlights. In some embodiments these prongs are surrounded by a waterproof covering 92 made of rubber, molded vinyl or any other suitable material. High beam out 44, common ground 46 and low beam out 48 can be ordinary and conventional coated wires or any other appropriate wire.

The second component of right headlight adapter 30, right control connector 24, is electrically coupleable to control receptacle 58. Control receptacle 58 is connected to headlight controls 26 by three wires, namely, control high beam 52, control ground 54, and control low beam 56. Right control connector 24 is adapted to engage control receptacle 58 in such a way that control high beam 52, control ground 54, and control low beam 56 are electrically mated to high beam feed 62, common ground 64 and low beam feed 66 respectively. When the adapter 30 is not in use, control receptacle 58 is coupleable with headlight plug 40. Thus the configuration of the prongs of right control connector 24 is usually identical to the configuration of headlight connector 16. Again, one example of this configuration can be found in FIG. 3. It should be noted that the "prongs" shown in FIGS. 3–5 and 8, which depict end views of connectors, can either be extending outward or recessed depending upon whether a male or a female plug is required to make the connector coupleable to the appropriate connection on vehicle 28. In other words, the connector used for the adapter will always be the inverse of the connector on the vehicle. Additionally, it should be noted that waterproof covering 92 could either be extending outward to cover prongs 86, 88 and 90 in the case of a male plug, or could be non-existent in the case of a female plug.

Returning to FIG. 2, common ground 46 running from headlight connector 16, and common ground 64 running from control connector 24 are electrically coupled at common ground connection point 68. This connection point may be any traditional connection, but is preferably waterproof to promote the integrity of the circuit. The coupling that occurs at common ground connection point 68 also creates a connection point for adapter common ground 70 which may carry either a positive or a negative ground signal depending on the vehicle.

Figure 6:
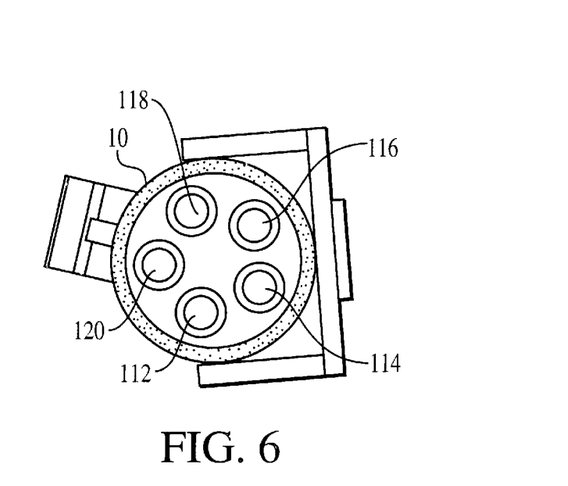
FIG. 6 is an end view of a wiring harness connector on a headlight adapter.

The connection of common grounds 46 and 64 provides five wires that lead to right harness connector 10. These wires include high beam out 44, low beam out 48, common ground 70, high beam feed 62 and low beam feed 66. Right harness connector 10 is typically a five-pin connector as depicted in FIG. 6. Comparing FIG. 6 to FIG. 2, high beam out terminal 114 corresponds to high beam out 44; low beam out terminal 112 corresponds to low beam out 48; ground terminal 116 corresponds to adapter common ground 70; high beam feed terminal 118 corresponds to high beam feed 62; and, low beam feed terminal 120 corresponds to low beam feed 66. Harness connector 10 is shown in a preferred embodiment in FIG. 6. One of ordinary skill in the art will readily recognize that the connector 10 can be varied in size, shape and configuration to accommodate a variety wiring harnesses. It should be noted first that harness connector 10 is a universal connector that works with the various types of headlight adapters disclosed herein. Like the other connectors, right harness connector 10 is preferably waterproof.

Right harness connector 10 is adapted to engage harness receptacle 72 which is actually a component of vehicle connection portion 8 of the wiring harness 11. The connection is such that low beam out 48 connects to harness low beam out 74, high beam out 44 connects to harness high beam out 76, common ground 70 connects to harness common ground 78, high beam feed 62 connects to harness high beam feed 80, and low beam feed 66 connects to harness low beam feed 82. The wiring harness 11 then connects each wire to the appropriate connection on the snowplow headlights. Headlight selector switch 13, connected to the wiring harness 11, allows an operator to choose between vehicle headlights 18 and 20 and snowplow headlights 4 and 6. That accounts for the need to connect the wiring harness 11 to the vehicle headlight 18 by virtue of right headlight connector 16. When the switch 13 is positioned to operate snowplow headlights 4 and 6, electrical signals travel from headlight controls 26 to right control connector 24, then to harness connector 10 along high beam feed 62 and low beam feed 66, and finally through wiring harness 11 to snowplow headlights 4 and 6. When switch 13 is positioned to operate vehicle headlights 18 and 20, the same signals travel to wiring harness 11 which then sends the signals back to harness connector 10 and then to right headlight connector 16 along high beam out 44 and low beam out 48.

Figure 4:
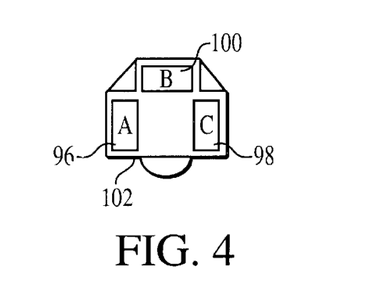
FIG. 4 is an end view of a vehicle connector on a three-component headlight adapter for use with a dual round headlight.
Figure 5:
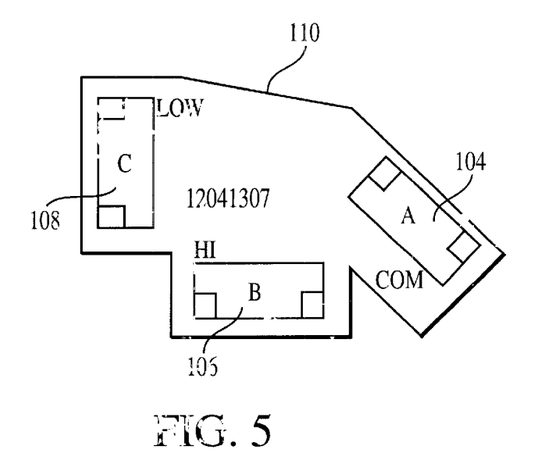
FIG. 5 is an end view of an alternative vehicle connector on a three component headlight adapter.

Returning to FIG. 1, the above description of right headlight adapter 30 is equally applicable an embodiment involving left headlight adapter 32 by itself or in conjunction with right headlight adapter 30. Additionally, there are several possible embodiments based on different configurations of headlight connectors 14, 16 and vehicle connectors 22, 24 depending on the type of vehicle 28 as well as the type of vehicle headlights 18 and 20. For example, the variation shown in FIG. 3 was previously described. although it should be added that waterproof covering 92 could either be extending outward to cover prongs 86, 88 and 90 in the case of a male plug, or could be non-existent in the case of a female plug. By way of further example, FIG. 4 depicts a second connector configuration 102, for use with dual round headlights, with low beam terminal 96, common ground terminal 98, and high beam terminal 100. FIG. 5 depicts a third connector configuration 110 with low beam tab 104, common ground tab 106, and high beam tab 108.

In another embodiment, not shown in the drawings, of the wiring scheme shown in FIG. 2, control receptacle 58 and vehicle connector 24 are removed. Instead control high beam 52, control ground 54 and control low beam 56 lead to three separate tab terminals which are well known in the art. High beam feed 62, common ground 64 and low beam feed 66 electrically attach directly thereto respectively. In addition, common ground connection point 68 can be eliminated by having common ground 46 run directly to the tab terminal at the end of control ground 54, and to have one wire run directly from control ground lead 54 to right harness connector 10 and specifically ground terminal 116 as shown in FIG. 6.

Figure 2A:
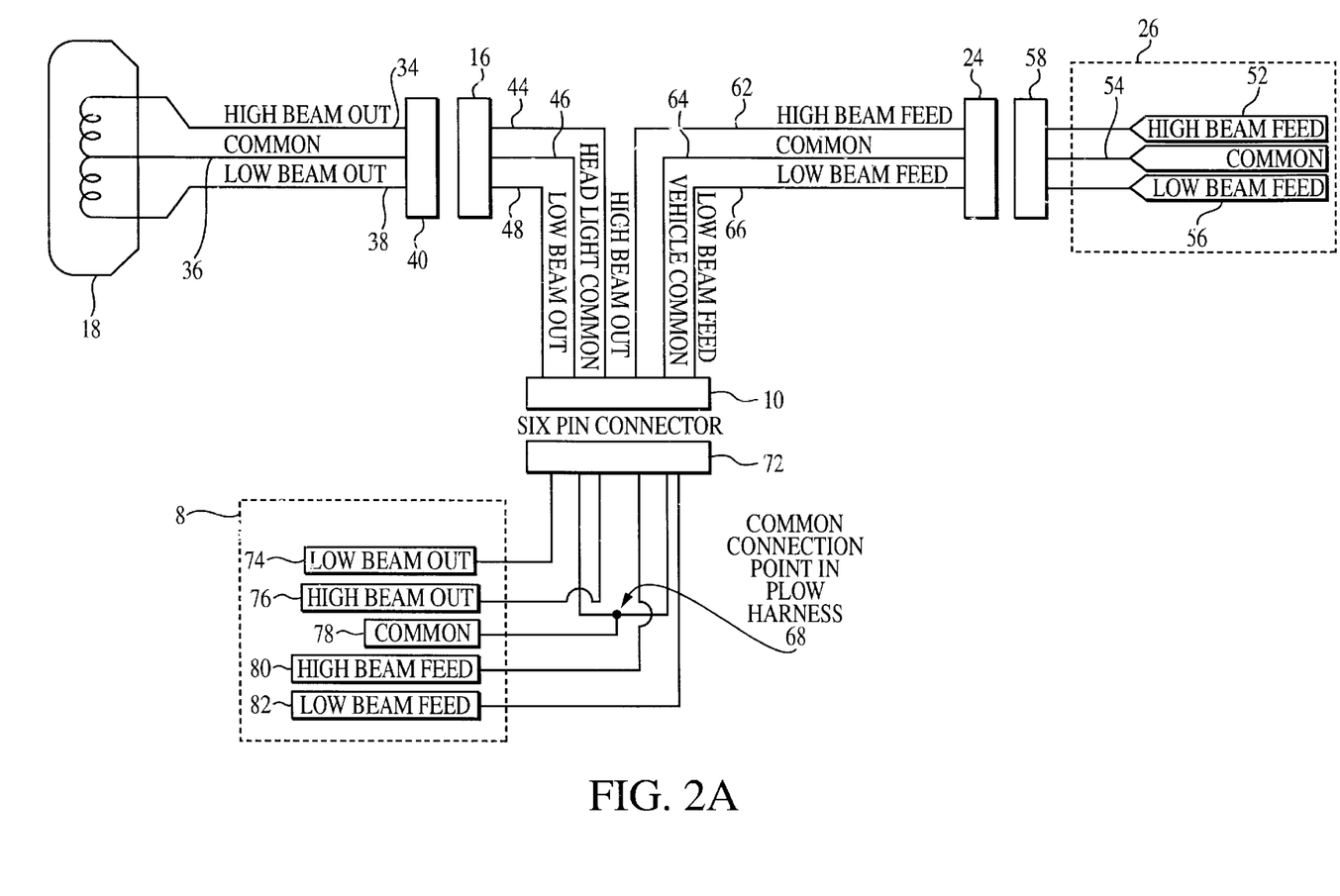
FIG. 2A is a wiring diagram of a three-component adapter with a six-pin wiring harness connector.

FIG. 2A depicts yet another embodiment of the adapter depicted in FIG. 2. Here, common ground. 46 and common ground 64 run directly to harness connector 10. Thus, harness connector 10 is a six-pin connector adapted to harness receptacle 72 which accepts six pins. The two common ground lines 46, 64 are then electrically coupled in wiring harness 11, and preferably within vehicle connection portion 8, at common ground connection point 68.

Figure 7:
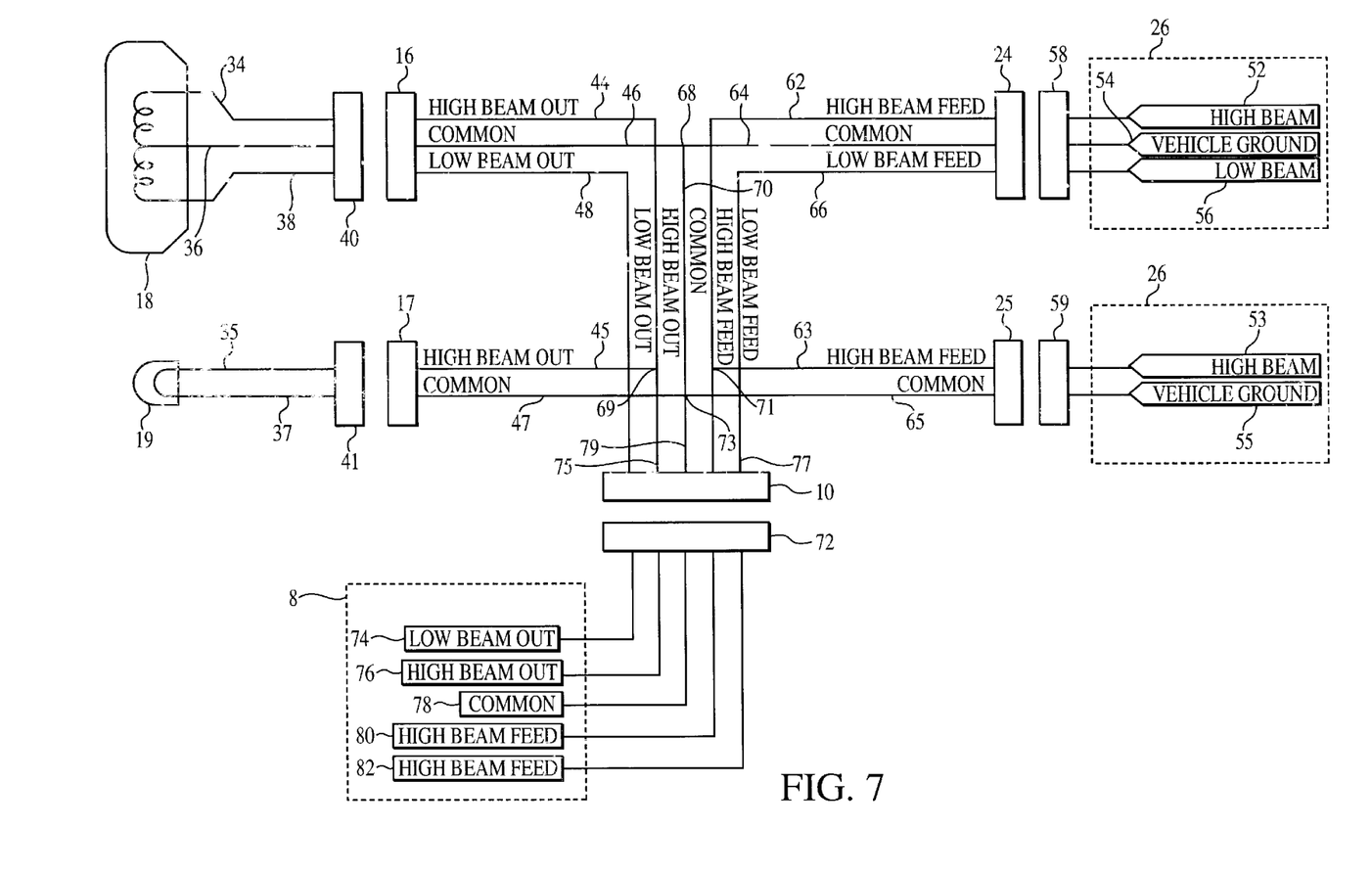
FIG. 7 is a wiring diagram of a five-component headlight adapter.

FIG. 7 illustrates yet another embodiment that is similar to FIG. 2. Like components have been identically numbered and will not be described again. The high beam headlights of some vehicles include an additional light as part of headlight 18. The separate high beam light is shown in FIG. 7 as secondary right vehicle headlight 19, and an additional control receptacle, shown as secondary control receptacle 59, is provided. Thus, a five-component adapter is required wherein three of the components are the same as in the three-component adapter of FIG. 2. The additional two components, and minor variations in the wiring, are described hereunder.

Figure 8:
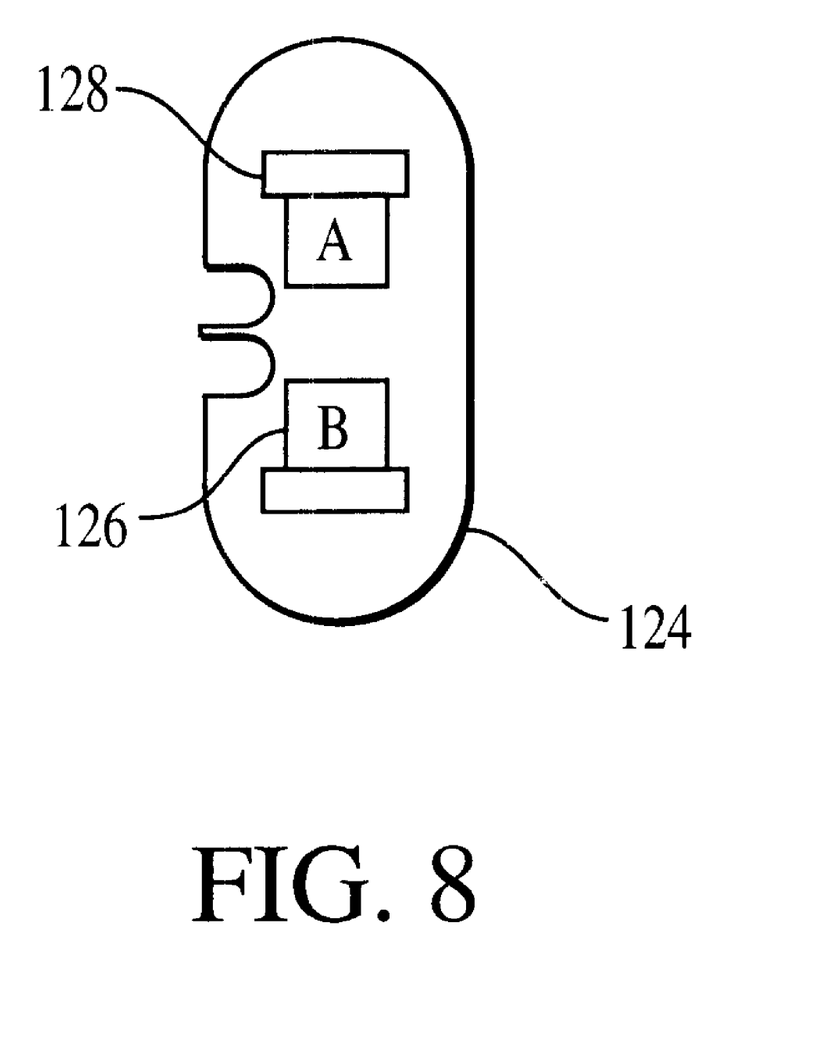
FIG. 8 is an end view of a vehicle, connector on a five component headlight adapter.

In this embodiment, secondary headlight connector 17 is electrically coupleable to secondary right vehicle headlight 19 by inserting secondary headlight plug 41 into secondary headlight connector 17. As shown in FIG. 8 secondary headlight connector 17 has secondary high beam prong 128 and secondary ground prong 126 that correspond to secondary high beam 35 and secondary ground 37 respectively. Prongs 128 and 126 are electrically connected to secondary high beam out 45, and secondary common ground 47, respectively, which are preferably conventional coated wires.

Secondary right control connector 25 is electrically coupleable to secondary control receptacle 59. Control receptacle 59 is connected to headlight controls 26 by secondary control highbeam 53 and secondary control ground 55. Secondary control connector 25 is adapted to engage secondary control receptacle 59 in such a way that secondary control high beam 53 and secondary control ground 55 are electrically mated to secondary high beam feed 63, and secondary common ground 65 respectively.

The secondary part of the adapter 30 must be connected with the adapter already described and shown in FIG. 2. To that end, secondary high beam out 45 is coupled with high beam out 44 at connection point 69 to create combined high beam out 75. Secondary high beam feed 63 is coupled with high beam feed 62 at connection point 71 to create combined high beam feed 77. Finally, secondary common grounds 47 and 65 are coupled to adapter common ground 70 at connection point 73 to create combined adapter common ground 79. The result of these connections is that five wires are electrically coupleable to right harness connector 10. These wires include combined high beam out 75, low beam out 48, combined adapter common ground 79, combined high beam feed 77, and low beam feed 66. These wires are connected to harness connector 10 in the same manner as described for a three-component adapter 30.

The shape, size and configuration of the prongs of secondary headlight connector 17 and secondary right control connector 25 can vary depending on the type of vehicle 28, and the type of headlights 18 and 20. One such alternative is depicted in FIG. 8. Secondary connector configuration 124 includes secondary high beam prong 128 and secondary ground prong 126 which correspond to secondary high beam out 45 and secondary common ground 47 or secondary high beam feed 63 and secondary common ground 65 respectively.

Yet another embodiment of the five-component adapter is required for some vehicles. This embodiment is nearly identical to that shown in FIG. 7. In this embodiment, which is not shown in the drawings, neither headlight plug 40 nor control receptacle 58 provides a high beam line. Headlight plug 40 provides connections only for common ground 46 and low beam out 48. Control receptacle 58 provides connection only for common ground 64 and low beam feed 66. Thus a two prong connector, a preferred embodiment of which is shown in FIG. 8, can be used for right headlight connector 16 and right control connector 24. The wiring scheme depicted in FIG. 7 is slightly altered. There is no high beam 34 and thus no high beam out 44. Similarly, there is no control high beam 52 and thus no high beam feed 62. Furthermore, secondary high beam out 45 is the high beam out and it connects directly to right harness connector 10. Similarly, secondary high beam feed 63 is the high beam feed, and connects directly to right harness connector 10 as well. This embodiment is in all other aspects identical to the five-component adapter previously described.

Those skilled in the art will further appreciate that the present invention may be embodied in other specific forms without departing from the spirit or central attributes thereof. In that the foregoing description of the present invention discloses only exemplary embodiments thereof, it is to be understood that other variations are contemplated as being within the scope of the present invention. Accordingly, the present invention is not limited in the particular embodiments which have been described in detail therein. Rather, reference should be made to the appended claims as indicative of the scope and content of the present invention.

What is claimed is:

1. A wiring system for alternatively controlling snowplow headlights and vehicle headlights by operation of a vehicle headlight control system, the wiring system comprising:

a wiring harness with a headlight selector switch coupled to the snowplow headlights;

a first adapter coupled to an existing right vehicle headlight, existing right vehicle headlight controls, and a wiring harness such that electrical signals corresponding to a high beam out, a high beam feed, a low beam out, a low beam feed and a common ground are provided to the wiring harness by a single connector; and a second adapter coupled to an existing left vehicle headlight, existing left vehicle headlight controls, and the wiring harness such that electrical signals corresponding to a high beam out, a high beam feed, a low beam out, a low beam feed and a common ground are provided to the wiring harness by a single connector.

2. The wiring system of claim 1 wherein the first adapter is identical to the second adapter.

3. The wiring of claim 2 wherein the first and second adapters are three-component adapters.

4. The wiring of claim 2 wherein the first and second adapters are five-component adapters.

5. The wiring system of claim 1 wherein the headlight selector switch is a predetermined automatic switch.

6. The wiring system of claim 1 wherein the headlight selector switch is a manual switch.

* * * * *

UNITED STATES PATENT AND TRADEMARK OFFICE
CERTIFICATE OF CORRECTION

PATENT NO.     : 6,396,210 B1
DATED          : May 28, 2002
INVENTOR(S)    : Peter C. Menze It is certified that error appears in the above-identified patent and that said Letters Patent is hereby corrected as shown below:

Column 1,
Line 27, delete "modem" and insert -- modern --
Line 38, delete "that to" and insert -- to --

Column 2,
Line 13, delete "to" and insert -- do --

Column 3,
Line 32, delete "are"

Column 4,
Line 41, delete "." after the word "adapter"
Line 62, delete "plug" after the word "prong"

Column 6,
Line 33, delete "." after the word "described"
Line 57, delete"." after the word "ground"

Column 7,
Line 23, delete "highbeam" and insert the words -- high beam --

Signed and Sealed this

Twentieth Day of August, 2002

Attest:

JAMES E. ROGAN
Attesting Officer    Director of the United States Patent and Trademark Office